No. 881,755. PATENTED MAR. 10, 1908.
C. WILKE.
DOWEL FOR FASTENING WOOD SCREWS IN RAIL CROSS TIES.
APPLICATION FILED MAY 25, 1907.

Witnesses:

Inventor
Carl Wilke
By
James L. Norris.
Atty.

UNITED STATES PATENT OFFICE.

CARL WILKE, OF BRUNSWICK, GERMANY.

DOWEL FOR FASTENING WOOD-SCREWS IN RAIL CROSS-TIES.

No. 881,755.  Specification of Letters Patent.  Patented March 10, 1908.

Application filed May 25, 1907. Serial No. 375,733.

*To all whom it may concern:*

Be it known that I, CARL WILKE, subject of the Emperor of Germany, residing at Brunswick, Duchy of Brunswick, Empire of Germany, have invented certain new and useful Improvements in Dowels for Fastening Wood-Screws in Rail Cross-Ties, of which the following is a specification.

My invention relates to improvements in dowels and more particularly to that class of dowels the general form of which is that of a cone, and which are put into the cross-ties of a track to give a reliable support to the spikes or screws by means of which the rail or the like is attached to the crosstie. And the object of my improvements is to provide a dowel which will not burst the crosstie by its wedge action when being driven into the same and which is very durable and reliable in its use.

To illustrate my invention I have shown an example thereof in the accompanying drawing in which—

Figure 1:
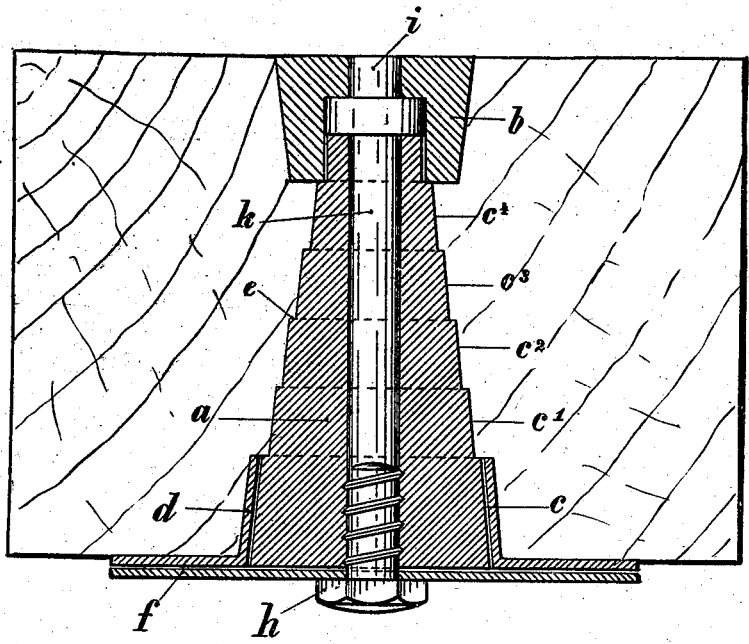
Figure 2:
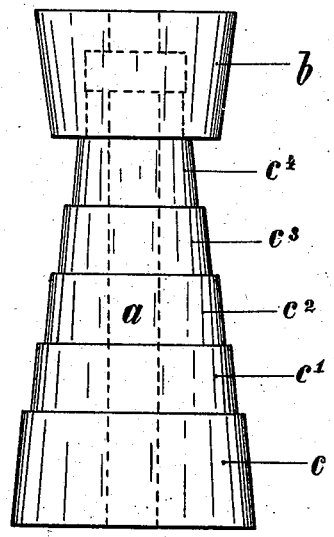

Figure 1, is a cross-section of a dowel embodying my invention, and Fig. 2, is a side view thereof.

Similar letters of reference refer to similar parts throughout the views.

The general appearance of my improved dowel is that of a wedge $a$. The said wedge consists of different sections $c$, $c^1$, $c^2$, the diameter of which is successively reduced so as to form annular shoulders $e$ between two consecutive sections. Each of the sections $c$, $c^1$ ... may be either of cylindrical form, or of conical form, so as to form itself a wedge. The cross-tie intended to receive the dowel is provided with a hole corresponding to the shape of the dowel, and likewise comprising sections of increasing diameter. The dowel will therefore not exert any bursting action on the tie on account of its wedgelike form, because its upward movement is stopped by the shoulders $e$. The latter will also prevent the dowel from being pulled out of the tie.

The dowel may be provided, at its upper end, with an annular cap $b$, affording a reliable support for the rail or its plate, so as not to be pressed into the tie. At the lower end of the dowel a metallic cap $d$, $f$ may be provided to protect the dowel from dampness. The parts are connected to the dowel by means of a screw $h$.

When the dowel is to be used, it is inserted from below into a hole of the crosstie, made so as to receive the same with a snug fit. The cap $b$ is then put over the upper end of the dowel. The spike or screw can now be inserted through a central hole $i$ of the cap into the bore $k$ of the dowel.

The construction of the sections, $c$, $c^1$ ..., as obtuse cones, referred to above will permit the dowel to be fitted into its hole more snugly, than in the case of cylindrical sections, though it can just as easily be inserted. Dangerous gaps between the dowel and the wall of its hole in the crosstie, into which water might enter, are thus avoided, while the annular shoulders $e$ will prevent an excessive lateral pressure of the dowel on the wall of its hole, when the upper cap $b$ is tightened.

The combination of the sectional parts $c$, $c^1$, $c^2$ etc. with the construction thereof as obtuse cones has therefore a very favorable effect on the durability and the reliability of the dowel and the crosstie.

It is evident that part of the sections $c$, $c^1$ etc. may be made cylindrical, while part only is conical.

Claims:

1. A dowel of the class described comprising a body formed of sections of successively reduced diameters providing shoulders between successive sections, said body having a central bore extending longitudinally throughout the extent of the same, and an annular cap mounted upon the reduced end of the body.

2. A dowel of the class described comprising a body formed of sections of successively reduced diameters providing shoulders between successive sections, said body having a central bore extending longitudinally throughout the extent of the same, an annular cap mounted upon the reduced end of the body, and means at the opposite enlarged end of the said body to protect the same from dampness.

3. The combination of a dowel comprising sections of successively reduced diameters providing shoulders between the successive sections, and a tie having a hole corresponding to the shape of the dowel for receiving the same.

4. The combination of a dowel comprising sections of successively reduced diameters providing shoulders between the successive sections, a portion of each section being formed into an obtuse cone, and a cross tie having a hole corresponding to the shape of the said dowel for receiving the latter.

5. The combination of a dowel comprising sections of successively reduced diameters providing shoulders between the successive sections, a portion of each section being formed into an obtuse cone, a cross tie having a hole corresponding to the shape of the said dowel for receiving the latter, a cap mounted on the reduced end of the dowel, and means at the opposite end of the dowel for protecting the same from dampness.

In testimony whereof I have hereunto set my hand in presence of two subscribing witnesses.

CARL WILKE

Witnesses:
WILHELM LEHRKE,
JULIUS SECKEL.